E. PROUTY.
SHOCK ABSORBER.
APPLICATION FILED DEC. 29, 1909.
971,636.
Patented Oct. 4, 1910.
2 SHEETS—SHEET 1.
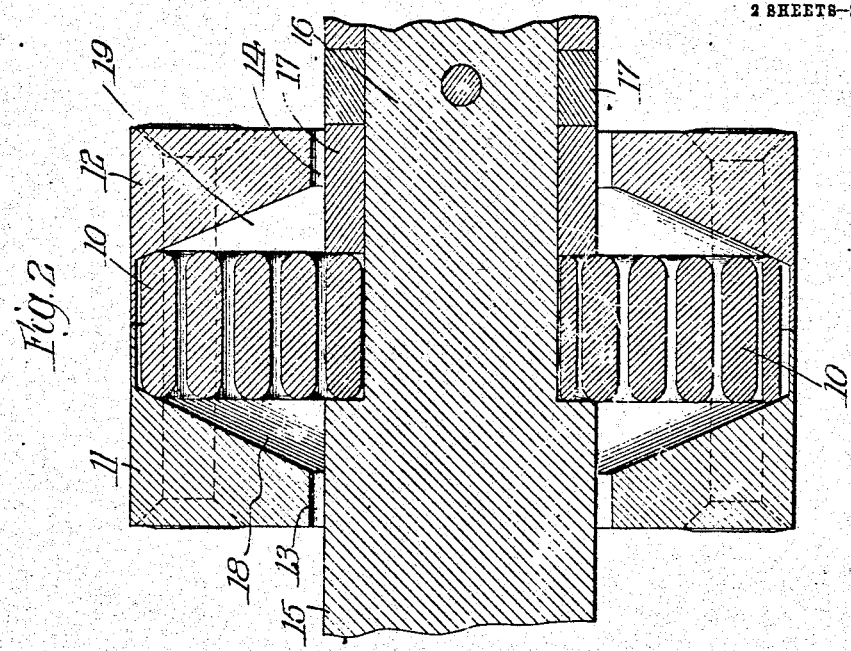
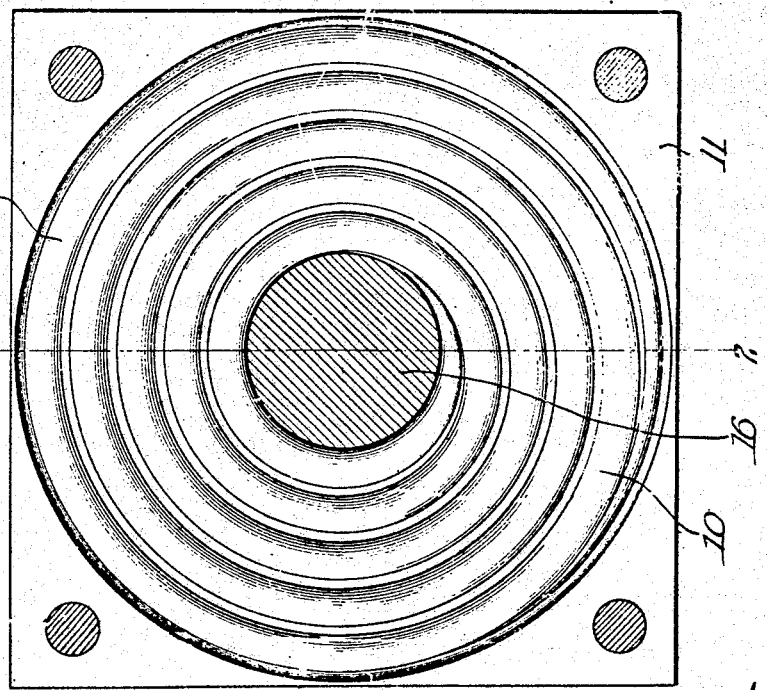

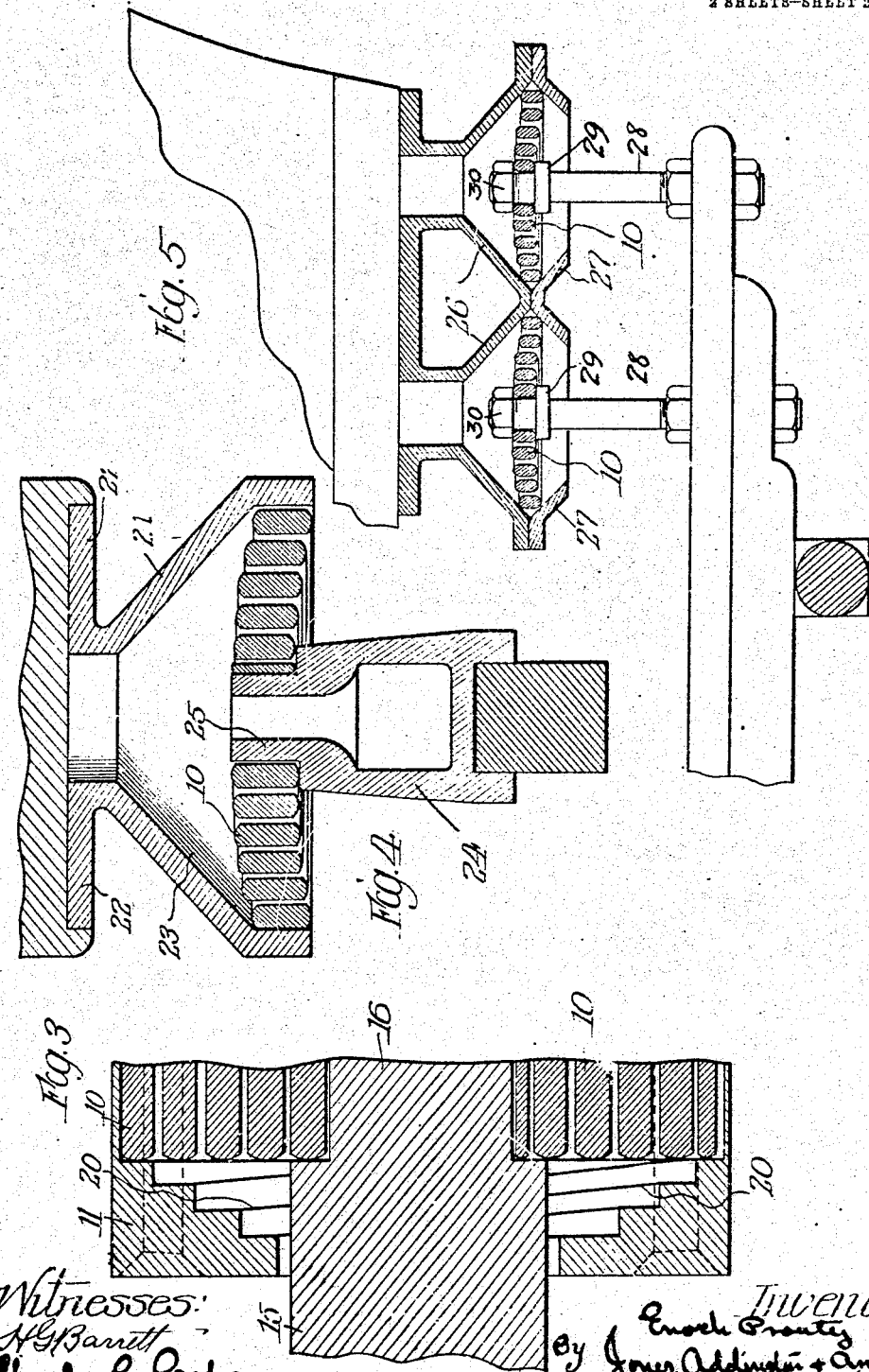

UNITED STATES PATENT OFFICE.

ENOCH PROUTY, OF PULLMAN, ILLINOIS.

SHOCK-ABSORBER.

971,636.  Specification of Letters Patent.  Patented Oct. 4, 1910.

Application filed December 29, 1909. Serial No. 535,391.

*To all whom it may concern:*

Be it known that I, ENOCH PROUTY, a citizen of the United States, residing at Pullman, in the county of Cook and State of Illinois, have invented new and useful Improvements in Shock-Absorbers, of which the following is a full, clear, concise, and exact description, reference being had to the accompanying drawing, forming a part of this specification.

My invention relates to a spring device for absorbing the shocks imparted to railroad cars, automobile bodies and the like during their motion, or those imparted to the draw bars of trains during starting and stopping, or during the running of the cars.

My device is useful in any connection where a part which should be protected from shocks, vibrations, etc., is connected to another part which is subject to such shocks and vibrations.

For an understanding of my invention reference is to be had to the following description and to the accompanying drawings in which I have illustrated, by way of example, several embodiments of my invention.

In the drawings:—Figure 1 is a plan view of my improved shock absorber, as applied to the draw bar of a railroad car, the device being shown with one half of the casing removed. Fig. 2 is a cross section on the line 2—2 of Fig. 1. Fig. 3 illustrates a modified form of casing which, in some cases, may be used in place of that illustrated in Figs. 1 and 2. Fig. 4 is a sectional elevation of a shock absorber according to my invention of a character adapted for use in supporting railroad car bodies, and Fig. 5 is a vertical section of a shock absorber according to my invention of a character adapted for use in supporting the bodies of automobiles and the like.

In carrying my invention into effect, I provide a substantially flat volute spring, that is, a spring formed by winding a rod or strip of metal upon itself to form a substantially flat spiral coil. I secure the outer convolution of this spring to the member which is to be protected from shocks or vibrations in such a manner that the plane of the spring is substantially at right angles to the line or plane along which the shocks or vibrations are liable to be communicated. I connect the member, the shocks or vibrations of which are to be absorbed, to the spring in such a manner as to extend substantially axially thereof. It is obvious, however, that the position of the member which is to be protected from shocks and vibrations and the member the shocks and vibrations of which are to be absorbed, may be reversed if such is found to be a preferable arrangement. It is generally desirable, in devices of this character, that the resistance offered to a shock should increase more rapidly than merely in proportion to the violence of the shock, as is the case with ordinary springs stretched or compressed within their elastic limits. In order that the resistance of the spring to distortion may increase more rapidly I provide a cone shaped seat on one side or the other, or on both sides, of the spring. The shape of the seat is such that the convolutions of the spring will engage it to a greater and greater extent if the spring is distorted by an increasing force applied thereto in the direction of the seat. The effect of this is that, one or more of the convolutions having seated, the remaining part of the spring becomes less resilient and will offer a greater proportionate resistance to the shock.

Referring now to the drawings and particularly to the form illustrated in Figs. 1 and 2, the spring 10, as stated above, is substantially flat and of volute form. The spring is contained in a chamber formed in a two part casing, the two parts, 11 and 12, of this casing being secured together by rivets or the like. The parts 11 and 12 of the casing are formed with central holes 13 and 14 through which the draw bar 15 may pass. The latter is turned down to form a reduced portion 16 which passes through the open center of the spring and is secured therein by means of one or more collars 17 suitably attached thereto. The draw bar thus extends axially of the spring.

The chamber formed between the parts 11 and 12 of the casing is of such shape as to present two conical seats, 18 and 19, against which the convolutions of the spring 10 will engage when the spring is distorted in one direction or another. Thus a slight shock imparted to the draw bar toward the left will cause a portion of the second convolution of the spring to engage the seat 18, and the greater the shock is the greater will be the portion of the spring engaging the seat. If the shock be strong enough the whole of the spring, with the exception of the innermost convolution which is contained between the collar 17 and the shoulder formed by the reduced portion 16 of the draw bar, will engage the seat. It will thus be seen that effective resistance of the spring becomes greater as the load placed upon it increases.

Instead of the smooth conical seat 18 or 19 I may provide a spirally descending ledge 20 (Fig. 3) of such shape as to form a flat seat for the spring when the latter is distorted.

When the shock absorber is to be used for supporting railroad cars it is usually unnecessary to provide a seat for the spring upon the lower side thereof. I, therefore, provide for such purposes an inverted open-ended conical casing 21 (Fig. 4) having at its upper end a flange 22 for enabling it to be secured to the car body. The casing is so formed internally as to present a shallow cylindrical portion in which the spring 10 may lie and a conical seat 23 similar to the seat 18 but having its sides set somewhat more steeply in order to allow a greater resiliency to the spring.

24 is a supporting pin having a reduced portion 25 which enters the opening at the center of the spring and forms a shoulder which acts as a support for the spring. The spring is shown in Fig. 4 as being somewhat bowed up by the weight of the car.

The modification shown in Fig. 5 is a duplex device consisting of a double casing having two portions 26, 26, each somewhat similar to the casing shown in Fig. 4. This device is intended for use in the supporting of automobile bodies, and in such work it is desirable to provide, besides the conical seat above the spring, at least a portion of such a seat beneath the spring to provide for the recoil. In this construction, therefore, I provide a cover consisting of similar portions 27, 27, adapted to fit over the open ends of the casing portion 26, 26 and clamp the springs 10 between them. These cover portions are so shaped as to present frusto-conical surfaces against which the outer convolutions of the springs will seat when there is a recoiling shock of any magnitude. It is not, however, necessary to provide seats of as great an area as those found in the casing portions 26, 26 and the cover portions are therefore cut off so as to provide seats for only the outer convolutions of the springs. Bolts 28, extending upward from the wheel frame of the automobile, enter the open centers of the spring 10 and have shoulders 29 thereon upon which the springs rest, nuts 30 serving to maintain the connection.

Having thus described my invention, what I claim is:—

1. A device for the purpose set forth comprising a member formed with a tapering depression, a substantially flat volute spring mounted in the larger part of said depression, the depression being of such character that the convolutions of the spring will engage the surface thereof when the spring is distorted, and a second member axially disposed with relation to the spring and engaging the latter.

2. A device for the purpose set forth comprising a member formed with a smooth tapering depression, a substantially flat volute spring mounted in the larger part of said depression, the depression being of such character that the convolutions of the spring will engage the surface thereof when the spring is distorted, and a second member axially disposed with relation to the spring and engaging the latter.

3. A device for the purpose set forth comprising a casing consisting of two parts, each having a conical depression formed therein and so disposed as to register with the depression formed in the other portion, a flat volute spring secured between the portions of said casing in such position that, when distorted in one direction or the other, its convolutions will seat against the wall of one or the other of said depressions, and a supporting member connected to said spring and extending axially thereof.

4. A device for the purpose set forth comprising a casing having formed therein a pair of oppositely disposed conical depressions, a flat volute spring disposed in said casing in such position that the convolutions of the spring will seat upon the wall of one or the other of said depressions when the spring is distorted in one or the other direction, and a supporting member connected to said spring and extending axially thereof.

In witness whereof, I have hereunto subscribed my name in the presence of two witnesses.

ENOCH PROUTY.

Witnesses:
 CHARLES G. COPE,
 E. R. KING.